United States Patent

Rothman

Patent Number: 6,148,840
Date of Patent: Nov. 21, 2000

[54] LOCKING MECHANISM FOR A VALVE OPERATING DEVICE

[75] Inventor: Ulf Rothman, Guernsey, United Kingdom

[73] Assignee: Ashbourne Limited, Guernsey, United Kingdom

[21] Appl. No.: 09/381,769

[22] PCT Filed: Mar. 25, 1998

[86] PCT No.: PCT/SE98/00538

§ 371 Date: Jan. 14, 2000

§ 102(e) Date: Jan. 14, 2000

[87] PCT Pub. No.: WO98/43837

PCT Pub. Date: Oct. 8, 1998

[30] Foreign Application Priority Data

Mar. 27, 1997 [SE] Sweden .................................. 9701142

[51] Int. Cl.[7] .............................. B60R 25/00; F16K 35/10
[52] U.S. Cl. .............................. 137/38; 70/237; 137/223; 152/415
[58] Field of Search .............................. 137/223, 38, 232, 137/230; 152/415; 138/89.1, 89.2, 89.3, 89.4; 70/237, 225

[56] References Cited

U.S. PATENT DOCUMENTS

| | | | |
|---|---|---|---|
| 2,737,223 | 3/1956 | Plath ...................................... | 152/415 |
| 3,003,539 | 10/1961 | Tone ...................................... | 152/415 |
| 3,910,221 | 10/1975 | Aske et al. ........................ | 116/34 R X |
| 4,375,200 | 3/1983 | Bertani et al. ...................... | 152/415 X |
| 4,657,057 | 4/1987 | Ha ......................................... | 152/415 |
| 4,818,029 | 4/1989 | Mourot et al. ...................... | 152/415 X |
| 5,090,223 | 2/1992 | Ruffler ................................ | 137/223 X |

FOREIGN PATENT DOCUMENTS 9624499  8/1996  WIPO .

*Primary Examiner*—John Rivell
*Assistant Examiner*—Meredith H Schoenfeld
*Attorney, Agent, or Firm*—James Ray & Associates

[57] ABSTRACT

The valve operating device comprises in a housing a valve operating member, which is movable in a compartment in the housing and at its underside has a generally cone-shaped recess, and an operating rod, which is in engagement with the recess with one end and with the other end is in contact with a valve actuating pin of a vehicle air valve, on which the device is mounted. It has a locking sleeve axially movable in the housing and being arranged coaxially with the operating rod and has an internal thread for attachment to the air valve and with an abutment for engagement with a pivotable locking pin of a lock in the housing.

5 Claims, 2 Drawing Sheets

LOCKING MECHANISM FOR A VALVE OPERATING DEVICE

TECHNICAL FIELD

The present invention relates to a valve operating device comprising in a housing a valve operating member, which is movable in a compartment in the housing and at its underside has a generally cone-shaped recess, and an operating rod, which is in engagement with the recess with one end and with the other end is in contact with a valve actuating pin of a vehicle air valve, on which the device is mounted.

BACKGROUND OF THE INVENTION

Such a valve operating device has been shown and described in WO 96/24499. The purpose of the device is to accomplish a deflation of a vehicle on which the device is mounted, if the vehicle is moved, or in other words to function as a very effective theft prevention device for cars, motorcycles and other such vehicles.

When the vehicle is moved, the valve operating member is displaced, depressing the operating rod, which in turn depresses the valve actuating pin and opens the air valve.

In order to properly function as a theft prevention device, however, it has to be locked to the air valve. Only an authorized person with a key shall be able to remove the device for enabling a normal driving of the vehicle.

The object of the invention is accordingly to provide a locking mechanism for such a valve operating device, the locking mechanism being completely reliable and safe—but yet simple and cheap.

THE INVENTION

This is according to the invention attained in that a locking sleeve axially movable in the housing is arranged coaxially with the operating rod and is provided with means for attachment to the air valve and with means for engagement with a pivotable locking pin of a lock in the housing.

When the air valve of a vehicle, as is normally the case, is provided with an external thread, said attachment means is an internal thread in the locking sleeve.

Alternative attachment means are possible.

Preferably, the engagement means is simply a circumferential flange on the locking sleeve.

THE DRAWINGS

The invention shall be described in further detail below reference being made to the accompanying drawings, in which FIG. 1 is a mainly sectional view through a valve operating device with a first embodiment of a locking mechanism according to the invention, FIG. 2 is a section through a housing for a second embodiment of a valve operating device with a locking mechanism according to the invention, FIGS. 3 and 4 are views from the left and from below of the housing according to FIG. 2, and FIG. 5 is a section through the second embodiment of a valve operating device with a locking mechanism according to the invention.

DETAILED DESCRIPTION OF PRACTICAL EMBODIMENTS

A valve operating device as disclosed in WO 96/24499 is to be attached to an air valve of a tire of a car, a motorcycle or the like.

Figure 1:
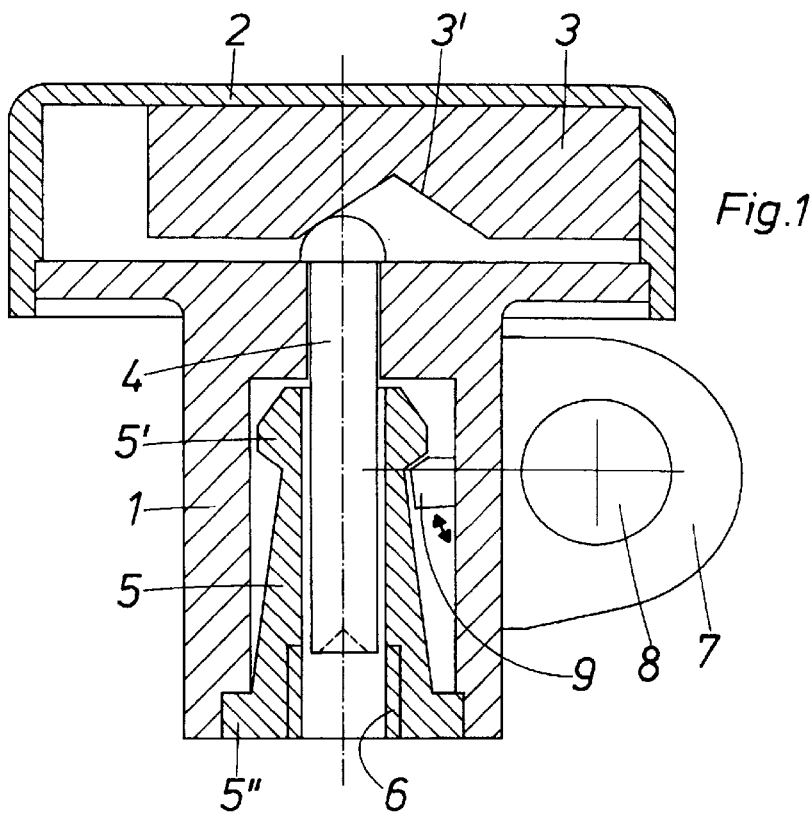

As appears in FIG. 1, it has a housing 1 for attachment to the air valve. The housing 1 has a cover 2 for forming a compartment, in which a disc-shaped valve operating member 3 is movable. At its underside the member 3 is provided with a generally cone-shaped central recess 3'. In engagement with the recess is an operating rod 4, which at its opposite or lower end is in contact with the valve actuating pin of the air valve, that is not shown in FIG. 1.

The compression spring in the air valve keeps the operating rod 4 in contact with the recess 3'. Unless any external force is applied to the operating member 3, the rod 4 will be kept centrally in the recess 3', and the air valve is closed. However, at a movement of the vehicle on which the device is mounted the operating member 3 is displaced, so that the operating rod is depressed, as is shown in FIG. 1. Hereby the valve actuating pin is depressed, letting the air out of the tire through the air valve.

In WO 96/24499 mention is made of a lateral or radial movement of the valve operating member. However, the operating member may also to a certain extent move axially, for example under acceleration. Hereby, the device will properly function to deflate a tire irrespective of the mounting angle of the device. With a proper geometry of the operating member, its recess and its compartment it has been shown that with a total weight of the device of only 46 grams it will open the air valve of a tire with an internal air pressure of up to 4 kp/cm$^2$ at a vehicle speed of 14–28 km/h.

The purpose of the device so far described is to prevent unauthorized movement of a vehicle provided with such a device, which will accomplish a deflated tire at such unauthorized movement.

However, unless the device is locked to the air valve, when the vehicle to be protected is left, anyone can remove the device and thus avoid the theft-preventing effect.

For the purpose of locking the device to the air valve a locking sleeve 5 is centrally provided in the housing 1. This sleeve 5 is axially movable in a central opening in the housing and has a central bore, through which the operating rod 4 extends and which at its lower end is provided with an internal thread 6 for its attachment to the air valve.

Along its length the locking sleeve 5 has a rotationally symmetrical, sloping surface ending in a circumferential flange 5'. At its lower end the locking sleeve 5 may have an abutment 5" for engagement with a housing recess.

In a housing projection 7 a lock 8 provided. This lock 8 may be of an ordinary rotary type operated by a key, which is removable from the lock in its locked condition. The lock 8 has a swiveling locking pin 9, which extends into the housing 1 and may be moved into and out of engagement with the locking sleeve flange 5 by means of the key.

In the locking position of the locking pin 9, shown in FIG. 1, with the locking sleeve threadingly attached to the air valve, it will be impossible to remove the device therefrom, because the housing 1 can not be lifted and because no unthreading rotational movement can be transferred from the housing to the locking sleeve 5.

Any movement of the vehicle on which the device is mounted will accordingly quickly result in a deflated tire.

When, on the other hand, the locking pin 9 has been removed from its engagement with the locking sleeve flange 5' through the authorized use of the key, the housing 1 can easily be lifted off from the locking sleeve 5, which then can be removed from the air valve, so that the vehicle can be driven normally.

Figure 2:
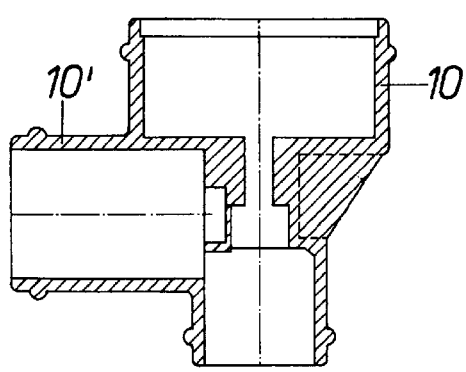
Figure 3:
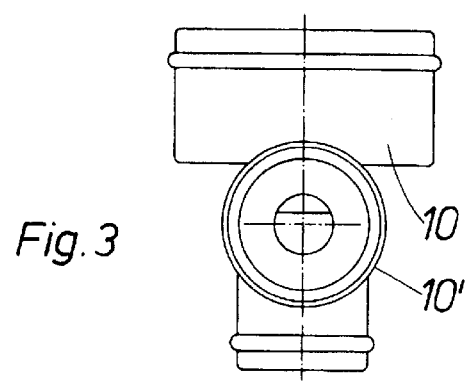
Figure 4:
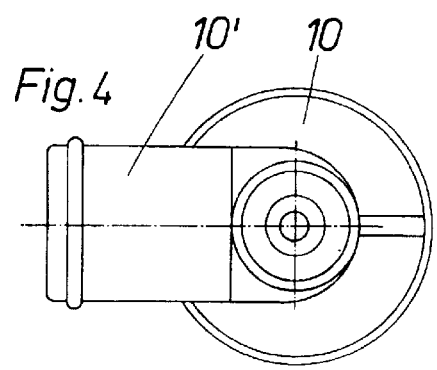
Figure 5:
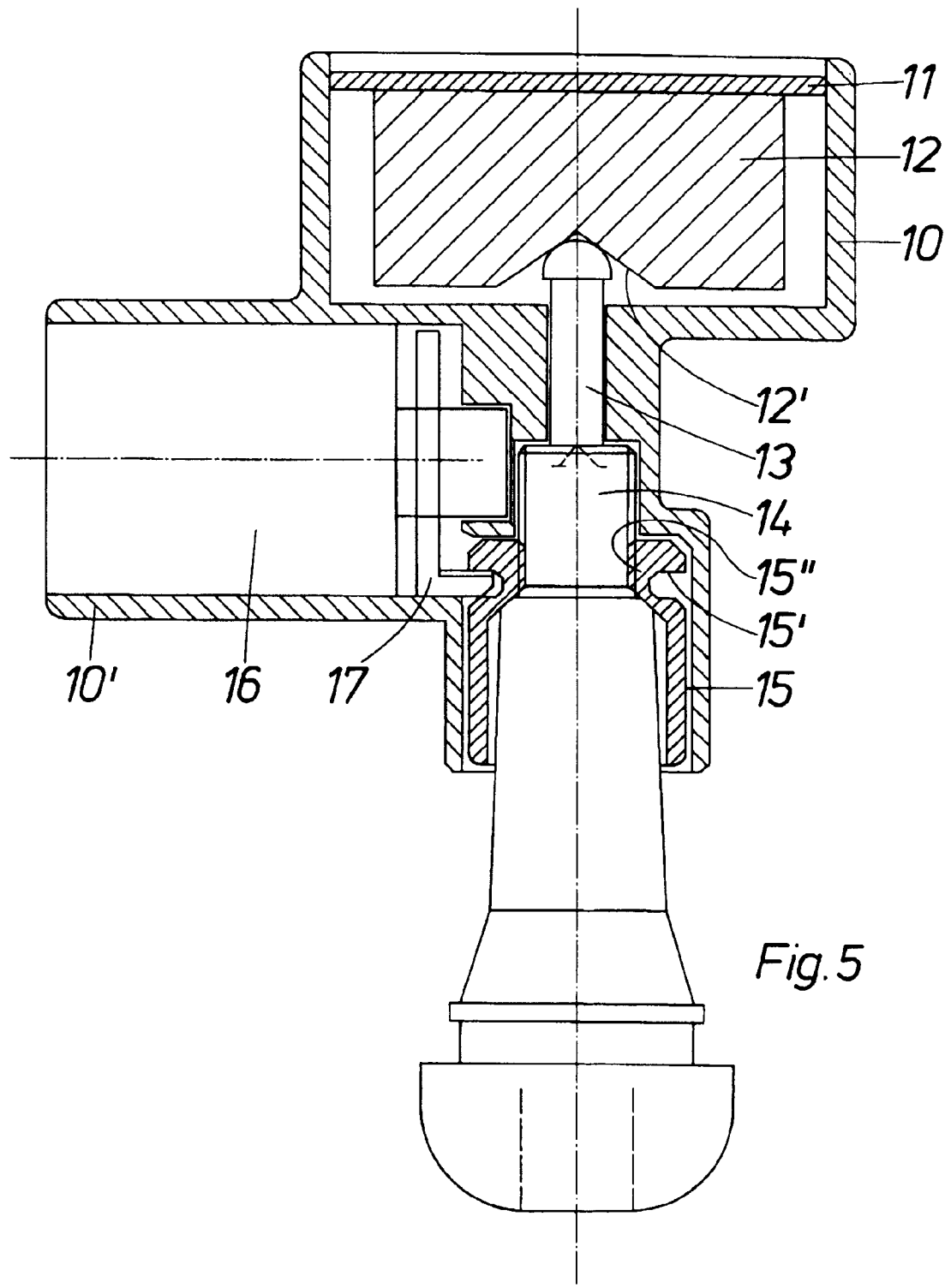

FIGS. 2–4 illustrate a housing 10 for a slightly modified device according to the invention. The internal parts for this device are shown in FIG. 5 and correspond to the parts shown in FIG. 1. In this case, however, the housing projection 10 for the lock extends axially towards the housing 10, which allows a more compact and handy design.

In the embodiment shown in FIG. 5 the housing 10 has a cover 11 for forming a compartment, in which a valve operating member 12 is laterally and axially movable. At its underside the member 12 is provided with a central recess 12' for engagement by an operating rod 13, which at its opposite or lower end is in contact with the valve acutating pin of the vehicle air valve 14.

The function of the device shown in FIG. 5 is the same as has been described in conjunction with FIG. 1.

The locking mechanism in this case differs slightly from that according to FIG. 1. A locking sleeve 15 is arranged in a central opening in the lower part of the housing. At its upper portion it is provided with an internal thread 15" for engagement with the external thread of the air valve 14. Its lower portion extends down over the stem of the air valve. This stem has a soft external surface, for example of rubber, and the lower portion of the locking sleeve 15 may have internal barbs or the like, whereby the locking sleeve may be threaded onto the air valve 14 but not off again. The locking sleeve 15 is in other words left permanently on the air valve 14, whereas the valve operating device may be mounted and dismounted.

The thread engagement of the locking sleeve 15 is preferably so short that a sufficient thread length of the air valve 14 is left for mounting of a protective cap or for control of the air pressure, when the valve operating device is dismounted.

Alternatively, the locking sleeve 15 may be attached to the air valve 14 by cementing, or else it may be manufactured of a deformable material and be permanently clamped against the stem of the air valve 14.

A lock 16 is provided in the housing projection 10'. A locking pin 17 of the lock 16 is here of a rotary type and may—by means of a key (not shown)—be pivoted into and out of engagement with a circumferential flange 15' of the locking sleeve 15. In FIG. 5 it is shown in its engaged position, whereby the valve operating device is locked to the air valve 14.

What is claimed is:

1. A valve operating device comprising in a housing (1; 10) a valve operating member (3; 12), which is movable in a compartment in the housing and at its underside has a generally cone-shaped recess (3'; 12'), and an operating rod (4; 13), which is in engagement with the recess with one end and with the other end is in contact with a valve actuating pin of a vehicle air valve (14), on which the device is mounted, characterized in that a locking sleeve (5; 15) axially movable in the housing (1; 10) is arranged coaxially with the operating rod (4) and is provided with means (6; 15") for attachment to the air valve and with means (5'; 15') for engagement with a pivotable locking pin (9; 17) of a lock (8; 16) in the housing.

2. A device according to claim 1, characterized in that the attachment means is an internal thread (6; 15") in the locking sleeve (5; 15).

3. A device according to claim 2, characterized in that the locking sleeve (15) is provided with internal barbs for locking engagement with the stem of the air valve (14) (FIG. 5).

4. A device according to claim 2, characterized in that the locking sleeve (15) may be permanently deformed against the stem of the air valve (14).

5. A device according to claim 1, characterized in that the engagement means is a circumferential flange (5'; 15').

* * * * *